Oct. 29, 1968  E. H. COCKS  3,408,008
APPARATUS FOR APPLYING HOT MELT ADHESIVES
Filed Dec. 2, 1966
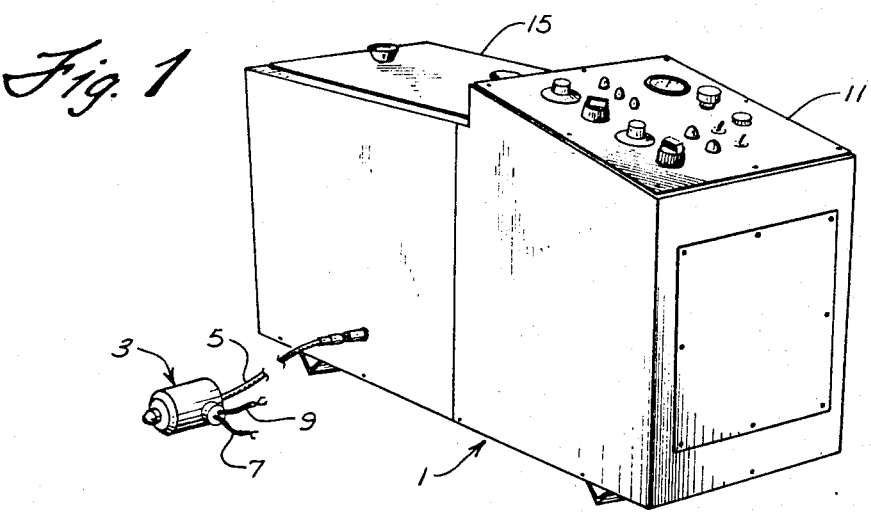
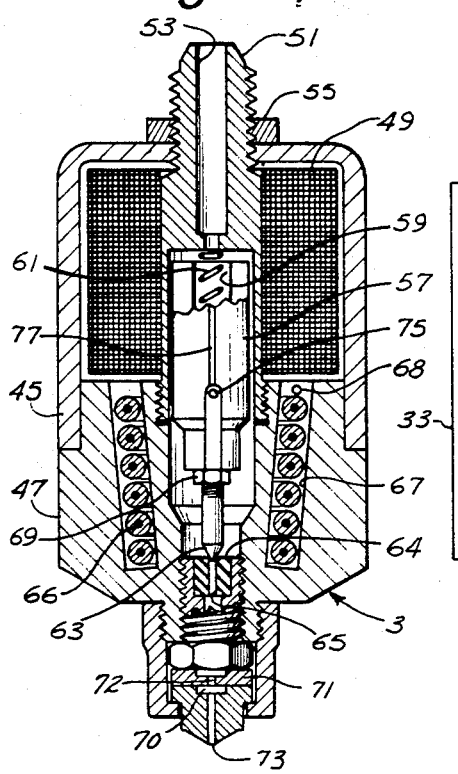
INVENTOR
ERIC H. COCKS
BY D.J. Crickenberger
ATTORNEY

United States Patent Office 3,408,008
Patented Oct. 29, 1968

3,408,008
APPARATUS FOR APPLYING HOT MELT ADHESIVES
Eric H. Cocks, Little Falls, N.J.
(21 Crane Ave., West Caldwell, N.J. 07006)
Filed Dec. 2, 1966, Ser. No. 598,707
2 Claims. (Cl. 239—135)

ABSTRACT OF THE DISCLOSURE

An apparatus for applying hot-melt adhesives comprises a heated tank and filter which supplies fluid adhesive to a pump for distribution through heated lines to a heated dispensing gun. The gun is an airless solenoid-operated device having an auxiliary pressure baffle in the adhesive flow path ahead of the conventional nozzle. Temperature sensors and heater controls provide the proper system temperatures.

Background of the invention

Hot melt adhesives are adhesives which normally exist in solid form at room temperature. In appearance they are generally similar to waxes with certain additives and formulations. When heated to a temperature between 200° F. and 500° F. these adhesives liquify and may be dispensed and applied by appropriate equipment. Typical applications of such adhesives are found in the packaging industry where it is frequently desirable to lay down lines of adhesive materials in the process of assembling boxes and other cartons.

It is frequently desirable to form the heated adhesives in short sections of lines, or even dots. Since the hot melt adhesives are usually very viscous in nature, any precisely controlled application presents a problem. Even when the plunger or valve mechanism utilized in the dispenser opens and closes properly, the heated adhesive will be sluggish in leaving the nozzle unless there is a high pressure in the system. This may produce a dripping or drag of the adhesive and defeat the requirements of precise application. When high pressure is utilized in the system so that the adhesive leaves the dispenser promptly, there will still be occasions where the initial release of pressure will cause a greater thickness of adhesive at the beginning point of application. In some cases such as applying a hot adhesive to polyethylene, a greater thickness of adhesive can be objectionable since this greater mass retains more heat. If the adhesive temperature is close to the melting point of the plastic, the heated adhesive may then cause the plastic to soften and adhere to itself.

In dispensing systems for adhesives and other materials the system may generally be classified as circulating or non-circulating in character. In a circulating system the material to be dispensed is constantly recirculated to prevent separation of the constituents of the material and assure a uniform product. In hot melt adhesive systems it is generally desirable to use a non-circulating system, since circulation of the adhesive tends to degrade the material and in many cases trap air bubbles. In using a non-circulating system for materials which are normally solid it becomes necessary to have sufficient heat throughout the system to keep the material in a fluid state. The present invention is concerned with a system for the application of hot melts.

A feature of the present invention is the provision of a system for the dispensing of hot melt adhesives having controlled heating present at all points in the system.

Another feature of the invention is the provision of a dispenser for hot melt adhesives which is capable of high speed of actuation for applying short sections of lines or dots of adhesive material of uniform consistency.

Another feature of the invention is the provision of a heated system for dispensing hot melt adhesives in which the temperatures at various points in the system are maintained in such fashion as to facilitate the ready handling of the material without degrading the quality thereof.

Summary of the invention

The system of the present invention comprises a non-pressurized supply tank which is heated to maintain the hot melt adhesive material in a fluid state somewhat below the actual temperature of application. An air-operated, double-acting pump is provided to force the fluid material to a remote dispensing station after it has left the supply tank by gravity feed into a heated sump. The fluid material leaves the supply tank by gravity feed into a heater which raises the temperature of the material as required. The heated material is then forced by the pump through a heated hose to the remote dispensing gun, which has also been heated.

The dispensing gun is designed for airless operation, and utilization of a pressure baffle assures the even application of the heated adhesive material. Precise operation of the gun is assured by a solenoid operating mechanism.

Description of the drawings

FIG. 1 is a perspective view of a console unit incorporating the apparatus of the present invention and having attached thereto a dispensing gun with connecting supply hose and electrical control cable;

FIG. 2 is a block diagram showing the component parts of the system arranged in logical flow sequence;

FIG. 3 is a cross-sectional view of a dispensing gun constructed in accordance with the principles of the present invention.

Description of the invention

The invention will be understood more readily by referring to the drawing in which FIG. 1 is a perspective view of a console unit 1 having attached thereto a spray gun 3 by means of supply hose 5 and electrical cables 7 and 9 for heating and dispensing control, respectively. The console 1 has an electrical control panel 11 from which all of the system operations can be controlled. The body of the console 1 contains the remaining system components which are shown diagrammatically in FIG. 2 of the drawings.

The hot melt adhesive utilized in this system exists in solid form at normal room temperatures, and is supplied to the tank 13 through the opening covered by lid 15 shown in FIG 1. Tank 13, which is open to and substantially at atmospheric pressure, has a heater 17 which operates to melt the solid adhesives, and the tank is shaped so that the liquid hot melt collects in a sump which contains a filter indicated generally by the numeral 19 in FIG. 2. The filter is preferably a removable mesh type which prevents contaminants from circulating through the system. Heater 17 is provided with an appropriate temperature sensor, which operates through conventional control circuitry to maintain the heater 17 at the proper temperature. This temperature is deliberately maintained at a lower value than the operating temperature of the remainder of the system, because many adhesives are degraded in quality if they are continuously held at a high temperature.

A second heater 21 operates to elevate the temperature of the hot melt adhesive fed from sump and filter 19. Heater 21 also has an appropriate temperature sensor to maintain accurately the desired operating temperature. The temperature induced in the hot melt by heater 21 is higher than the temperature of heater 17, and this higher temperature is effected only for the adhesive as it passes from the sump for use in the system. The dual heat provision of this system permits the solid hot melt to be heated in tank 13 to a relatively low temperature where it becomes fluid, but not subject to degrading, while the small amount of adhesive to be processed through the system for dispensing is elevated to operating temperature by heater 21.

The hot melt adhesive is forced through the system by an air-operated, double-acting pump 23, which has its own heater 25 associated therewith. Heater 25 also has a temperature sensor for maintaining the hot melt adhesive at the desired operating temperature. Pump 23 forces the adhesive to hose manifold 27 which is provided with heater 29 having appropriate temperature sensing control.

The adhesive is dispensed at a work station through gun 3, which is connected to hose manifold by means of supply hose 5, which has a heating element contained therein to maintain the adhesive in liquid form through its travel from the manifold 27 to the gun 3. The heated supply hose 5 also has a temperature sensor, and the heat and sensing operations of hose 5 are conveniently combined with the operation and control of heater 29, and so are not shown separately on the drawing.

The control block 11 of FIG. 2 corresponds to the control panel 11 of FIG. 1 and contains conventional circuitry known in the art for sensing temperatures and supplying current in accordance with a desired temperature. Each of the connections 33 to 37 represents current supply lines to heating elements, and each of the connections 38 to 43 represents temperature sensing lines. Thus, it will be seen that control block 11 determines the temperature of the hot melt adhesive in various parts of the system of the invention. This control is necessary because the adhesive solidifies throughout the system when the system is not in operation. Therefore, it is necessary to maintain precise heat control throughout the system so that, when it is turned on, the adhesive will attain the desired fluid consistency at all points in the system.

FIG. 3 is a cross-sectional view of the spray gun 3. The gun 3 is shown as comprising cylindrical members 45 and 47 assembled to define a hollow interior space containing solenoid operating coil 49. Tubular member 51 with internal passageway 53 therein has one end threadedly mounted in cylindrical member 45 and the other end threadedly mounted in cylindrical member 47. An appropriate locking means such as nut 55 holds tubular member 51 in position. A plunger member 57 having a hollow interior passage 59 is slidably mounted in the end of tubular member 51 opposite from passageway 53. Passage 59 terminates in three ports 75 evenly-spaced around plunger 57. Three evenly-spaced grooves 77 are disposed longitudinally of plunger 57 and terminate adjacent ports 75. Spring 61 biases plunger 57 so that the point 63 closes orifice 65 in resilient valve seat 64 to shut off operation of the gun.

The point 63 is detachably mounted in a threaded recess in the end of plunger 57 and is adjustably positioned by means of locking nut 69. With this construction a variety of points may be used and minute operational adjustments may be made in the assembled length of the plunger 57. This adjustable feature is of particular importance where precise fluid application is required.

A spirally wound heater coil 66 is provided to maintain the fluid consistency of the hot melt adhesive. The coil 66 is disposed in recess 67 which is aligned coaxially with plunger 57. The temperature is monitored by means of a thermistor element 68 located within recess 67 with the heater coil 66.

A pressure baffle member 71 comprising a disc with a central aperture 72 therethrough is disposed above dispensing orifice 73 and serves to retard the surge of adhesive which is present when the plunger 63 first opens. When the system is operating to dispense small dots of adhesive the pressure baffle 71 apparently sets up a primary reduction of the pressure in the fluid in chamber 70 prior to reaching dispensing orifice 73. This action insures uniform application of adhesive over a wide range of viscosities.

The passage of hot melt adhesive through gun 3 can be traced from its entrance in passageway 53 through hollow portion 59 of the plunger 57 downwardly and out through ports 75. A portion of the adhesive travels downwardly along the side of plunger 57 in grooves 77. The adhesive then passes through orifice 65, normally closed off by plunger 63, through pressure baffle member 71 and out through dispensing orifice 73. The plunger 57 acts as the armature in conjunction with solenoid coil 49, and when coil 49 is energized, plunger 57, which is normally biased downwardly by spring 61 against the resilient valve seat 63, is raised by magnetic attraction, thereby opening orifice 65 and allowing fluid to flow. The diameters of the passages for the fluid through orifice 65, pressure baffle 71 and dispensing orifice 73 are dependent upon the viscosity of the hot adhesive.

It will be appreciated from the above description that the system of the present invention is operable with precise control to dispense viscous hot melt adhesive materials which are difficult to apply with precision. The dual heat system maintains adhesive quality without degrading, and the provision of heating throughout the system enables the use of a non-circulating system having a high degree of reliability.

While the invention has been shown and described with particular reference to a preferred embodiment, it will be understood by those skilled in the art that various changes in form and details may be made without departing from the spirit and scope of the invention.

What is claimed is:

1. A system for dispensing hot melt adhesive comprising tank means for storing hot melt adhesive at substantially atmospheric pressure, tank heater means for maintaining said adhesive at a first predetermined temperature within said tank, operating heater means for raising the temperature of said adhesive from said first predetermined temperature to a second predetermined operating temperature after said adhesive leaves said tank means, pump means for supplying pressure to force said adhesive through said system, pump heater means for maintaining operating temperature within said pump means, hose means for carrying adhesive from said pump means, hose heater means for maintaining operating temperature within said hose means, dispensing gun means connected to said hose means for dispensing adhesive, said dispensing gun means comprising gun heater means for maintaining operating temperature within said gun, a fluid passageway within said gun, dispensing orifice means, a valve plunger within said fluid passageway to control the flow of adhesive to said dispensing orifice means, said valve plunger having an interior passageway therethrough for the passage of hot melt adhesive to said dispensing orifice means, and means for bypassing said interior passageway with a portion of said adhesive to be diverted around said valve plunger to said dispensing orifice means, valve seat means within said fluid passageway, and control means for sensing the temperature of the adhesive material at various points throughout the system and supplying heat as required in accordance with the sensed temperature.

2. The combination according to claim 1 comprising chamber means disposed between said valve seat means and said dispensing orifice, and pressure baffle means disposed in said chamber means adjacent said dispensing orifice means, said pressure baffle means having a central aperture therethrough to retard surges of adhesive passing through said chamber means.

References Cited

UNITED STATES PATENTS

| | | | |
|---|---|---|---|
| 1,504,773 | 8/1924 | Marston | 239—585 |
| 2,878,836 | 3/1959 | Binks | 239—534 XR |
| 3,069,999 | 12/1962 | Morrison | 222—146 XR |
| 3,226,030 | 12/1965 | Rossi | 239—135 |
| 3,248,093 | 4/1966 | DeMaison | 239—135 |

FOREIGN PATENTS

| | | |
|---|---|---|
| 133,099 | 12/1932 | Austria. |
| 1,170,661 | 1/1959 | France. |
| 725,162 | 3/1955 | Great Britain. |

WALTER SOBIN, *Primary Examiner.*